Dec. 11, 1945.  A. E. JOHNSON  2,390,714
ROTARY TOOL BOOSTER
Original Filed March 23, 1943  2 Sheets-Sheet 1
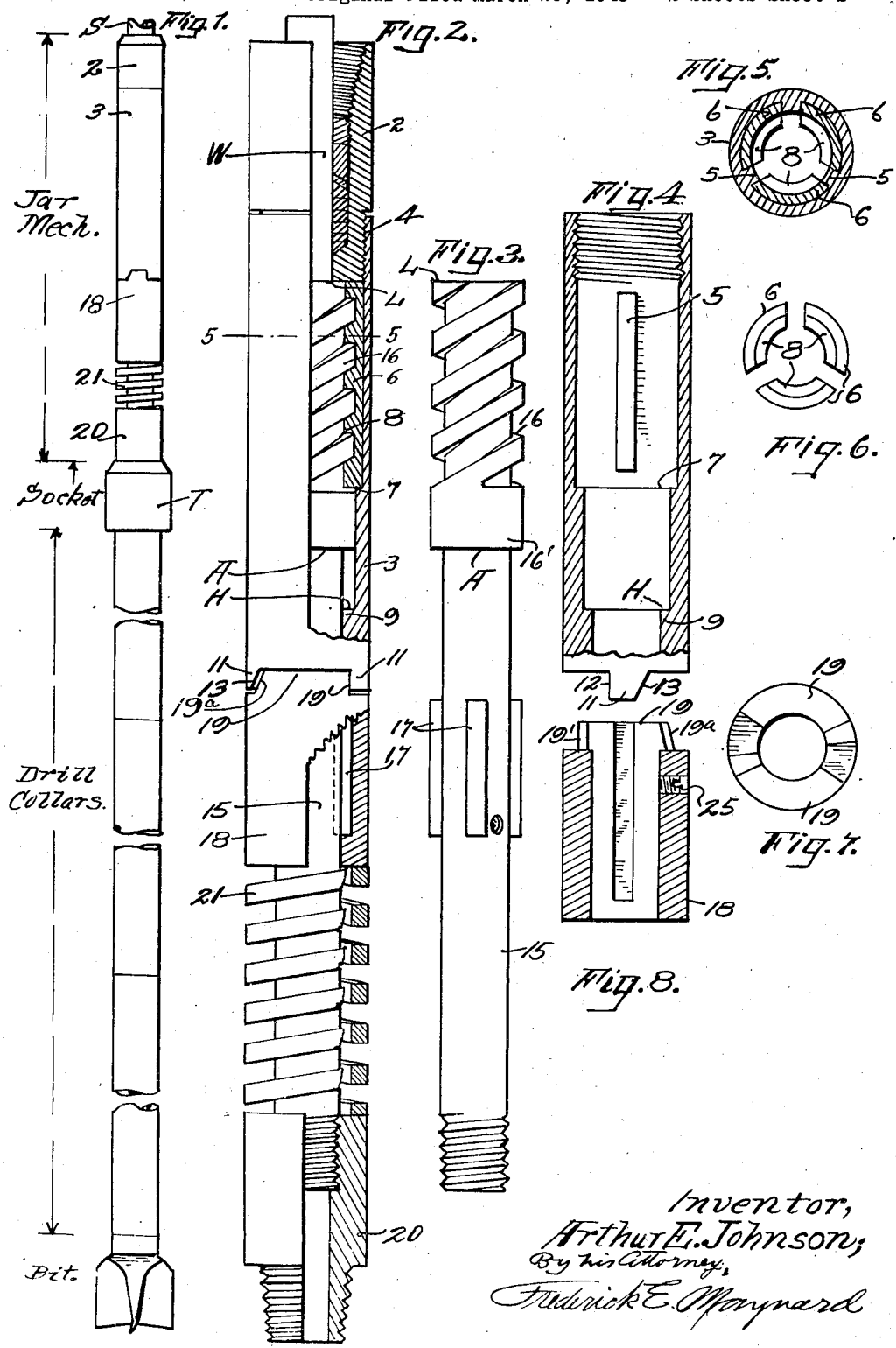
Inventor,
Arthur E. Johnson;
By his Attorney,
Frederick E. Maynard

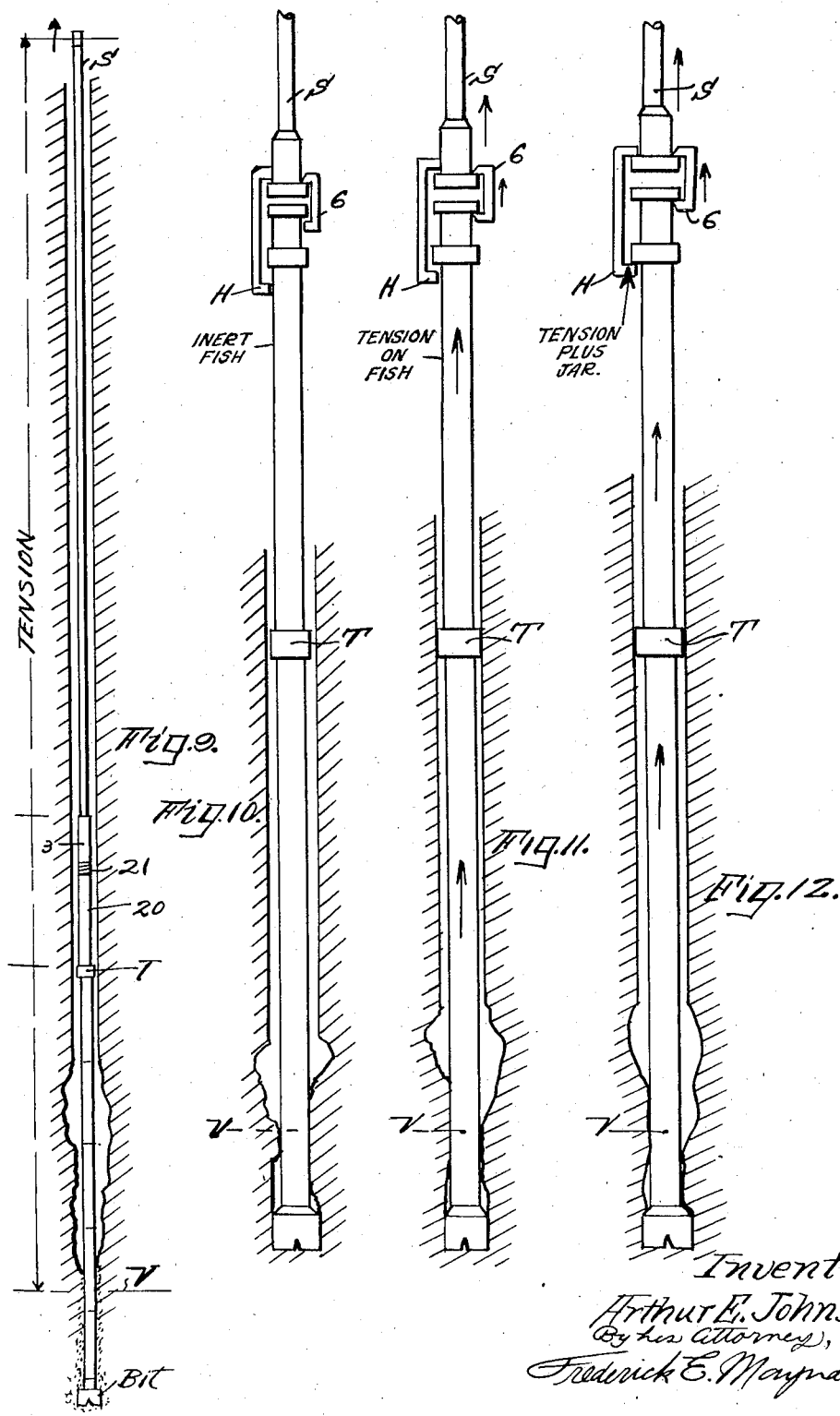

Patented Dec. 11, 1945

2,390,714

UNITED STATES PATENT OFFICE 2,390,714

ROTARY TOOL BOOSTER

Arthur E. Johnson, Taft, Calif.

Substituted for abandoned application Serial No. 480,256, March 23, 1943. This application September 8, 1945, Serial No. 615,151

2 Claims. (Cl. 255—27)

This invention is a mechanism for use in deep well or bore hole operations, for instance, and particularly, in the recovery or salvaging of well tool parts or other bodies as may be lodged tightly in the hole and not pullable by conventional tools and practice. If the invention is to be considered as in use in well fishing string operations it is explained that general and conventional practice includes the lowering of a fishing tool socket (as an example) to catch solidly onto the frozen fish, and the tool string is then tensioned in an attempt to disengage the body from the formation or other holding cause. This tension dare not be raised above the safety factor of the tool apparatus or a dangerous breakdown somewhere in the entire apparatus from fish to crown block may be the result, and if the parts break in the hole, the hole and the entire fragment may be utterly lost.

In order to help in breaking free the anchored fish various kinds of devices have been contrived whereby to impart sudden, sharp upward blows or downshocks of various degrees of intensity to the fishing tool socket (or other employed implement) and in use of these devices a tension is put on the string up to a degree as will overcome some holding or locking and release element and therefore permit the tension of the string to operate by way of a hammer (in the assembly) to strike a coordinate anvil which is attached by way of the socket to the fish. The upstart given the anvil is transmitted to the fish and it may or may not be knocked loose.

In all the currently used jars—at the moment that the hammer is tripped and released for function all string tension is unloaded from the socket and also, therefore, from the entrained fish, and all parts combined by firm attachment to the anvil and down to the fish are instantly freed from a state of tension with and by the string and they in effect become just a dead load whose entire inertia must be overpowered by vibration of and from the hammer striking the anvil element. In the case of a long drill collar hook-up this inertia load is great and much tension must be set up before the tripped hammer can initiate the freeing influence on the frozen, or perhaps, just lost fish. In briefest words—when the fishing tool trips off the hammer the pull on the fish is instantly interrupted and the fish is restored to just an inert mass.

It is an object of this invention to provide a simple apparatus for string tension effect tool operations and whereby the objections brought out hereabove—of de-tensioning the string and fishing mechanism, and of the fish down to the vibration point—are eliminated. And it is an object to provide an apparatus, of the tension function class wherein and whereby the highly desirable jarring function is accomplished whilst the employed apparatus is under tension down to and including the vibration point of the object being fished.

An additional object is to provide a jarring mechanism which enables different degrees of tension to be set up, and held, to work in conjunction with the hammer blow, and to provide for tamping action, and an object is to provide means operative by torque in the tool string to predetermined tensions at which the hammer may be tripped for stroke. And in this connection it is an object to provide independent trip controls useable separately or conjointly in predetermining string tensions of various degrees.

Further, an object of the invention is to provide a tool jar mechanism of extremely rugged structure free from complex, insecure control trips other than a simple, single, yieldable clutch having also the purpose of a positive rotary drive connection between an upper, string rotative, hammer assembly and a lower coordinate fish pulling and jarring socket and anvil assembly.

Briefly stated, it is an object of the invention to provide a compact apparatus whereby to effectively put the body of the fish above the point of vibration (below which it is non-vibrative) under a state of string tension and while it is still subject to a considerable degree of such tension to suddenly apply a high upstarting shock, additive to the tension already established and eliminating dead inertia of the mass of entrained parts at the foot of the tool string, and including, say a long drill collar hook-up, a socket implement and the attached fish. Hence substantially all of the upstart blow is effectively applied as a lifting energy and none is lost as a mere peening incident as in cases where the jar blow must be spent initially to overcome mass inertia—as in current practice and tool work.

As an example, a drill collar two hundred feet long may be lodged in a deep hole and while the holding cause may be only at the foot of the tool it may be that the fishing socket cannot get past cavings or drilling mud to a lower joint in the collar assembly. Now if the socket is applied and tensioned the whole length of the collar assembly is put under tension right down to the bit, say, which may be the only part directly frozen. The collar assembly (held by the frozen bit) is—by this invention—placed under tension and its inertia can be regarded as overcome or neutralized down to the immediate point of vibration stop. Wherefore, if the jar mechanism is now disengaged, during sustained string tension, that is, if the hammer is freed, the jar blow is not largely lost in an effort just to overcome tool and fish inertia, but it is instantly added to the force of string tension and the boost is substantially 100% aidful in imparting upward motion to a drill collar assembly already manifestly in a state of suspension bodily down to the vibration point of the fish.

This invention consists in certain advancements in this art as set forth in the ensuing disclosure and having, with the above, additional objects and advantages as hereinafter developed; and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinbelow.

Figure 1 is an elevation of a drill string in which the booster is combined and is shown with the jar mechanism in normal, closed relation.

Figure 2 is an elevational, axial section of the booster mechanism; shown locking the parts in normal closed relation.

Figure 3 is an elevation of the anvil mandrel, (wash pipe omitted).

Figure 4 is an axial section of the hammer barrel.

Figure 5 is a cross-section on line 5—5 of Fig. 2.

Figure 6 is a plan of the constant-couple cam or threaded bushing segments.

Figure 7 is a top plan of the locking sleeve, and

Figure 8 is an axial section of the same.

Figure 9 is an elevational diagram showing the tool as fishing a long drill collar assembly frozen just above the bit; thus affording a long, tensionable fish.

Figure 10 is a diagram showing the attached mechanism hanging slack and leaving the fish totally inert. Figure 11 shows the tension in the hook-up down to the vibration point of the fish; the hammer being open. Figure 12 shows the tensioned hook-up being struck by the tripped hammer while the fish is under a lesser but sustained tension.

By a head works turntable there is suspended a rotative tool string S of necessary length to which is directly attached by a taper pin a top sub 2 of conventional type and which will here be considered as a part of an upper, hammer assembly or unit. This includes a substantial barrel 3 pipe-threaded at 4 to the sub 2 at the upper portion and having rigidly fixed or integral splines 5, Fig. 4, whose purpose is to laterally nest an annular cluster of segments 6 stepped on a bore shoulder 7 in the barrel 3.

These segments constitute a unitary, fixed housing or bushing characterized by a fairly fast-pitched, helical thread 8 made by grooving the bore of the segmental bushing. The thread 8 projects slightly inwardly of the barrel bore below the step shoulder 7 and at its lower portion the barrel has an internal shoulder 9 forming a hammer rim H.

As seen in Fig. 2, the lower end of the barrel has a pair of annularly spaced dogs 11 having flank faces 12 parallel to the axis of the sleeve for rotary drive function, and also have oblique faces 13 for a tripping or release function.

The anvil assembly or unit

A tubular mandrel 15 is provided at its upper portion with a helical thread 16 matching the bushing thread 8 and just below this mandrel thread 16 is an enlarged, annular shoulder 16' presenting an annular end or anvil face A downwardly toward the hammer H of the barrel bore. The upper end of the mandrel forms a stopping land L to limit telescopic movement of the bushing 6 down the mandrel threads 16, and incidently fixes the angular motion of the barrel relative to the mandrel and the coupling registration of the dogs 11. Somewhat below the anvil shoulder 16' the mandrel body has a set of annularly spaced ribs or keys 17 of suitable length and on them is splined against rotation an axially shiftable mandrel-rotating clutch sleeve 18 whose upper end has locking dogs 19 matching in end notches presented between the end dogs 11 of the barrel 3. It is preferred that the locking dogs 19 be considerably longer peripherally than the barrel dogs 11 to insure desired registration of the clutch dogs as and when the barrel 3 is lowered or moves to engaging position with the sleeve 18. The keys 17 limit upward sleeve movement on the mandrel 15 and the sleeve does not run up on the mandrel in event the barrel 3 is shifted upward therefrom on the mandrel as will hereinafter be described.

A wash pipe W is fixed on the mandrel and is packed in the top sub 2.

A bottom sub 20 has a right hand thread and is screwed onto the lower end of the mandrel 15 and any suitable fishing or other tool is attachable thereto. It can be stated here that, in a fishing job, once the socket T if one is used, is solidly caught onto a fish in a hole then the mandrel 15 constitutes an anchor in so far as the rest of the fishing jar mechanism is concerned and establishes tension if there is an effort to pull the tool string from the hole if and while the mandrel is fish anchored.

The function of the sleeve 18 is to transmit right hand rotation, by and from the barrel 3, to the mandrel in a normal rotary drive of the apparatus down to and including the implement on the bottom sub 20, and this rotation is the result of the engagement (by right hand turn) of the right angle faces 12 of the barrel dogs 11 with the mutual faces 19' of the dogs 19 of the sleeve 18 as turned by the barrel. But the sleeve serves a further and important function, namely, to bring about an automatic unlock or release of the hammer assembly and its suspending string S from the anchored mandrel 15 and to permit the hammer H to spring up and strike the anvil A of the mandrel. Therefore, the sleeve is constantly thrust upward to its limit by a substantial spring 21 interposed between the sleeve bottom and the sub 20.

The operation

Assuming that the jar mechanism is mounted in a tool string, just above the top drill collar, Fig. 1, and the barrel 3 is run down the mandrel 15 until the sub 2 stands on the land L of the mandrel and that the clutch sleeve 18 is firmly interlocked in the dogs 11 of the barrel, the implement (such as the socket T) can be lowered and rotated until it is fastened on a fish to be pulled from a hole. The anvil A at this time is spaced up from the suspended hammer H, as in Fig. 2. A pull can now be put on the whole string in a first effort to break loose and lift the fish; either with or without a low torque in the string.

All the load of this effort will be placed on the top helical face of the bushing thread 8 and on the bottom face of the mandrel thread 16.

If after a few preliminary trials the fish does not come loose an initial, right hand twist is set up in the string by tongs at the derrick, say two turns as to the anchored mandrel to place a heavy pressure at the back face 19' of the dogs 19. A tension is now put on the string S and the result is that the bushing threads 8 take the load at the meeting faces as the effort is transmitted from the barrel segments 6 onto the mandrel threads 16 and the dogs 11 of the barrel butt against the faces 19a of the lugs 19 of the sleeve. When the tension is high enough the barrel 3 back turns (left hand, looking down the tool) and the barrel initiates an upward glide on the fixed (anchored) mandrel threads 16. Great resistive friction is now set up as between the meeting faces 13—19a of the coupling dogs because of the high angle (say 80° to a line at a right angle to the axis of the mandrel) of the locking faces. In this position the mandrel and the barrel are locked against relative axial motion. By pulling on the barrel on the anchored mandrel until a tension is given the string S it will cause the thread 8 to overcome mandrel thread friction and depress the sleeve 18 downward on its spring 21, and the whole hammer assembly, from the top sub to the hammer shoulder H, is instantly cleared of the locking dogs 19 of the sleeve 18 and the threads 8 glide helically up along the threads 16 of the stationary mandrel with a very rapid stroke, because of the still retained tension held in the jar parts interconnected against a free straight shift of the barrel by the mutually engaging (and never free) mandrel and barrel threads 16 and 8. The up stroke of the barrel along the mandrel brings the hammer H with a violent impact onto the stationary and still tensioned mandrel anvil A, and further there is a rotating moment of force given the mandrel due to the back-turn action of the barrel 3.

Briefly, when the jar hammer is tripped off the dogs 19 of the holding sleeve 18 the hammer is freed only to shift axially as fast as the interengaged threads will allow due to their interfriction, and this latter is incident to the residual tension purposely maintained by the initial windup of the barrel on the mandrel threads and the back run of the barrel does not disconnect the same from the mandrel but still pulls the mandrel. Therefore, while the entrained jar assemblies are subjecting the fishing tool and the fish to tension it is clear that their inertia is negated, indeed, these bodies are placed in a state of tension by the tool string S. In a fairly long hookup the stretch at the head works is very considerable and therefore in such a case even if there is some slack given up when the hammer H is free to lift on the mandrel there is still ample tension in the string-to-bottom-sub 20 train to overcome the inertia of the fish (above the vibration point V, Fig. 9). Now while the residual or a sustained tension is in force down to the anchored socket the blow is received from the released hammer barrel and its energy is at once concurrently applied to the fishing socket and the engaged fish— which are not now a simple dead weight as is the case in all well known, currently used jars.

It is here stated that no jar energy is intended for the sleeve 18: all jar impact is derived from string contraction.

When the released hammer barrel is to be relocked to the sleeve the tension is let off and the dogs 11 will turn right hand on the threads, 16 down to the dogs 19 of the upthrust sleeve which will be slightly depressed until the mutual upper and lower dogs interregister again.

The best fishing practice teaches that a heavy make-up is to be used just above the socket so that the inertia of this weight, two to one of the fish, is juxtaposed to the fish and when the tensioned jar mechanism is tripped and the hammer is freed the heavy make-up momentum is supposed to be jolted against the fish and anvil train. But in a conventional jar the unlocking of the hammer from the anchored fish allows this to lose its tension down to the vibrating point and it is just a dead load to be hoisted or loosened. Since a primary function of this invention is to always hold the fish under tension down to the vibration point, it will be seen that its inertia is largely or entirely overcome and therefore no heavy make-up, just above the socket, is needed.

To graphically illustrate: Fig. 9 shows a long drill collar assembly, below the socket T, to be fished out and the vibration point V is just above the bit, and the fish portion above said point can be put under tension by the socket string and the inertia of the fish portion is thus negated, at the moment of jar, by this invention. Fig. 10 shows in diagram all parts in slack relation: connector 6 being loose and hammer H open; the fish is wholly inert—that is, is not under tension though the socket may be engaged. Fig. 11 shows the connector 6 is under tension by the string and is pulling on the fish: the hammer is still open. Fig. 12 shows tension kept up by the connector 6 and the hammer is in effective jarring impact on the anvil A of the mandrel. Even if some tension is lost from the train, because of trip off of the hammer for stroke, the fish is still tensioned by way of the constantly effective interengagement of the threads 8—16, which constitute the connector 6.

It is well known that if the fish is put under high tension and if this is left sustained for hours—without jar—the then applied jar energy sometimes overcomes the earth grip on the fish and this will be freed.

Therefore it will be seen that in the present invention there is the advantage that the fish is under tension at all times during lock of the mandrel and the hammer barrel and even when the hammer is finally tripped and the impact is applied to the anvil. In this manner a compounding of fish pulling energy is secured; (1) string and fish tension without interruption and (2) a jar impulse in the direction of sustained, upward tension.

The locking sleeve 18 may be, in some jobs, held fast in a position below and free of the sleeve dogs 11 as by a hold-down screw 25. In this use the whole string and jar mechanism may be dropped for bumper-sub function. And while the sleeve is bolted down as just stated, considerable torque can be put in the string to make friction between the interengaged threads 8 and 16 so that a desired tension will have to be generated in the string before the thread friction is negated and the hammer is let go. It is understood that tension can be set up without any torque if a lighter blow is deemed best; say for a trial on the fish. Or, if a much higher tension is found needed then the screw 25 is not set to hold down the sleeve 18, ab initio, and without torque the tension must overcome the unintensified thread friction and the reaction set up by the strong spring 21 which closes the mutual dogs 11 and 19. If still greater jar is needed then the string S is turned on the frozen mandrel to require much greater tension to overcome torque reaction between the dogs 11 and 19. The higher the degree of tension at the moment the hammer is released the higher will be the retained tension at the moment the hammer hits the anvil because there will be a longer degree of stretch in the string from the tower elevator down to the vibration point of the fish: conversely the shorter the stretch the lighter the jar impact.

This application is a substitute for abandoned application #480,256, filed March 23, 1943.

What is claimed is:

1. A well tool jar assembly for use as a tool string constituent and which includes relatively telescopic and relatively rotative cylinder and plunger elements one having an anvil part and the other a hammer part whose driving stroke is powered by tension in the tool string to impinge the said anvil, and a yieldable device for locking the said elements in a position with the hammer spaced from the anvil for jarring stroke; said elements having rigid therewith constantly interengaged, fast pitch screw threads which are relatively slidable to permit power stroke of the hammer after initial string tension has effected release action of said device; said threads by their mutual friction maintaining a degree of tension in the assembly equalling a substantial part of the initial tension whereby to effect the jar stroke of the hammer.

2. A tool string assembly for jarring objects in a well hole and including a cylinder connectible at one of its ends to a relative string section and having an internal, rigid, fast pitch screw thread and carrying a hammer part, a mandrel telescopically and turnably fitting in the cylinder and having a rigid thread complementary to and constantly meshing with the said cylinder thread and the mandrel having an anvil part to be struck by the hammer part under tension of the thread connected cylinder and mandrel, said meshing threads setting up mutual frictional resistance against relative axial shift of the cylinder on the mandrel, and a trippable device to lock the cylinder with the hammer spaced from the anvil and which is released by a desired string tension in the assembly; said threads operative to maintain a substantial degree of the initial tension in the assembly after hammer release by said device, whereby to effect the impinging stroke of the cylinder with its hammer.

ARTHUR E. JOHNSON.